(12) United States Patent
Cairo-Iocco et al.

(10) Patent No.: US 6,338,456 B1
(45) Date of Patent: Jan. 15, 2002

(54) LANDING IMPACT ABSORBING DEPLOYMENT SYSTEM FOR AIRCRAFT WITH DAMAGED LANDING GEAR

(75) Inventors: Renee Cairo-Iocco, Silver Spring; John P. Wehrle, Greenbelt, both of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/671,861

(22) Filed: Sep. 28, 2000

(51) Int. Cl.$^7$ .............................................. B64D 19/00
(52) U.S. Cl. ................... 244/139; 244/100 A; 244/121
(58) Field of Search ............................ 244/121, 138 R, 244/139, 17.17, 100 A

(56) References Cited

U.S. PATENT DOCUMENTS

| | | | |
|---|---|---|---|
| 5,259,574 A | 11/1993 | Carrot | |
| 5,765,778 A | 6/1998 | Otsuka | |
| 5,836,544 A | * 11/1998 | Gentile | .................... 244/17.17 |
| 5,992,797 A | 11/1999 | Rotman et al. | |
| 6,042,051 A | * 3/2000 | Hagerty | ........................ 244/49 |

* cited by examiner

Primary Examiner—Peter M. Poon
Assistant Examiner—Timothy D. Collins
(74) Attorney, Agent, or Firm—Jacob Shuster

(57) ABSTRACT

Inflation of impact absorbing bags is effected in time delayed relation to selective jettisoning of damaged landing gear on a helicopter prior to landing for replacement of the landing gear by the bags, without puncture thereof by the landing gear being jettisoned.

11 Claims, 2 Drawing Sheets

LANDING IMPACT ABSORBING DEPLOYMENT SYSTEM FOR AIRCRAFT WITH DAMAGED LANDING GEAR

The present invention relates generally to emergency, non-crash landing of aircraft after damage to its landing gear.

BACKGROUND OF THE INVENTION

The use of pressurized gas inflated bags to absorb impact during emergency landing of an aircraft, has already been proposed in accordance with various prior art safety landing systems, as respectively disclosed for example in U.S. Pat. Nos. 5,259,574 to Carrot, 5,765,778 to Otsuka and 5,992,794 to Rotman et al. The inflated bags cushion impact with a landing surface otherwise stricken by the fixed landing gear associated with a helicopter type of aircraft as disclosed in the foregoing referred to patents to Carrot and Rotman et al. Such inflated bags when deployed project from the bottom of the helicopter substantially below its fixed landing gear to engage the landing surface during a crash or difficult landing without removal of the landing gear. It is an important object of the present invention to deploy such impact absorbing crash landing bags on a helicopter aircraft having a different and improved relationship to the mechanical landing gear otherwise utilized during a normal landing.

SUMMARY OF THE INVENTION

In accordance with the present invention, the mechanical helicopter landing gear is selectively jettisoned from locations in wells formed in the bottom of the helicopter, upon detection of landing gear damage prior to a landing operation. After being jettisoned, the landing gear is replaced by impact absorbing bags displaced into the wells. Such landing gear is selectively detached from the helicopter within the wells through releasable fasteners to initiate said jettisoning under gravitational force. The impact absorbing bags are displaced into the wells from a stowage container in response to gas pressure inflation thereof from a deflated condition while stored in the container. Further, such inflation is initiated in time delayed relation to selective detachment of the landing gear to avoid jettison interference and damaging puncture of the deployed impact absorbing bags.

BRIEF DESCRIPTION OF DRAWING

A more complete appreciation of the invention and many of its attendant advantages will be readily appreciated as the same becomes better understood by reference to the following detailed description when considered in connection with the accompanying drawing herein.

DETAILED DESCRIPTION OF PREFERRED EMBODIMENT

Figure 1:
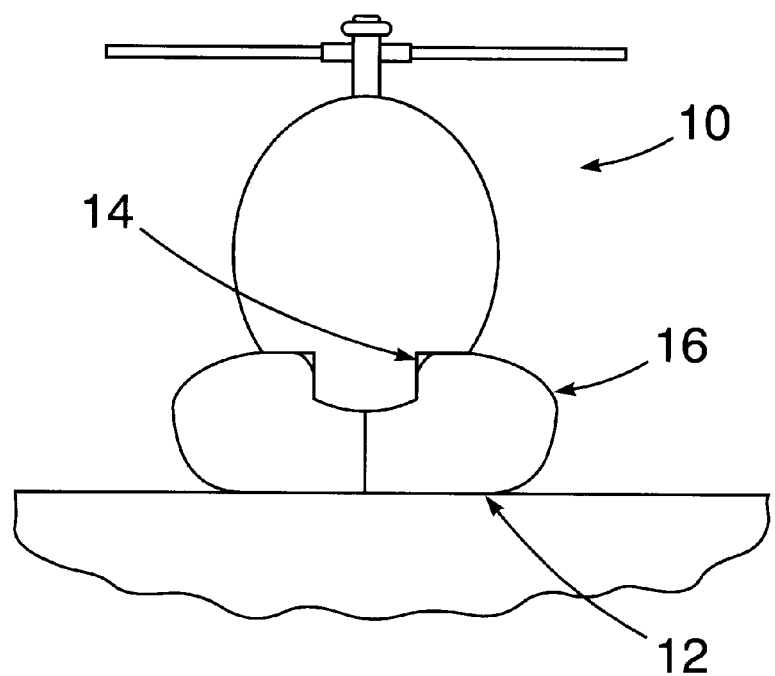
FIG. 1 is a simplified front elevation view of a helicopter after deployment of impact absorbing bags in contact with a landing surface upon completion of a landing operation.

Referring now to the drawing in detail, FIG. 1 illustrates an aircraft such as a conventional type of helicopter 10 which has landed on a flat surface 12, such as the landing deck of an aircraft carrier. The helicopter 10 has formed in the bottom thereof a pair of landing wheel wells 14, within which landing gear assemblies are replaced by inflated gas bags 16, shown supporting the helicopter on the deck surface 12.

Figure 2:
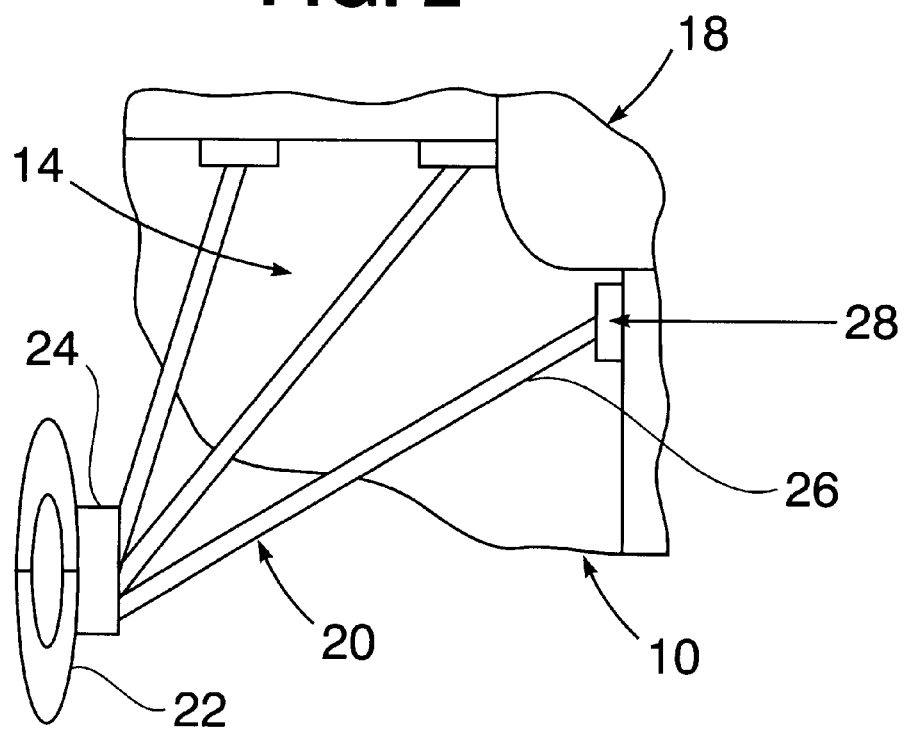
FIG. 2 is a partial front elevation view of the helicopter shown in FIG. 1, prior to landing thereof.

FIG. 2 illustrates a portion of the helicopter 10 prior to landing, with the gas bags in a deflated condition enclosed within a stowage container 18, from which the bags are displaced by inflation into the wells 14. One of the landing gear assemblies 20 as shown projects from each well 14 in operative condition. Each landing gear assembly 20 includes a wheel 22 rotationally supported by a hub 24 connected to the ends of three wheel supporting struts 26 respectively attached to the frame of the helicopter within a well 14 by means of releasable attachment fastener assemblies 28. When either of such landing gear assemblies 20 is damaged during flight of the helicopter 10, both are jettisoned from the aircraft by pneumatically controlled release of the fastener assemblies 28, followed by deployment of gas bags 16 into the wells 14 as shown in FIG. 1, prior to landing of the helicopter to prevent crash landing as hereinafter explained.

Figure 3:
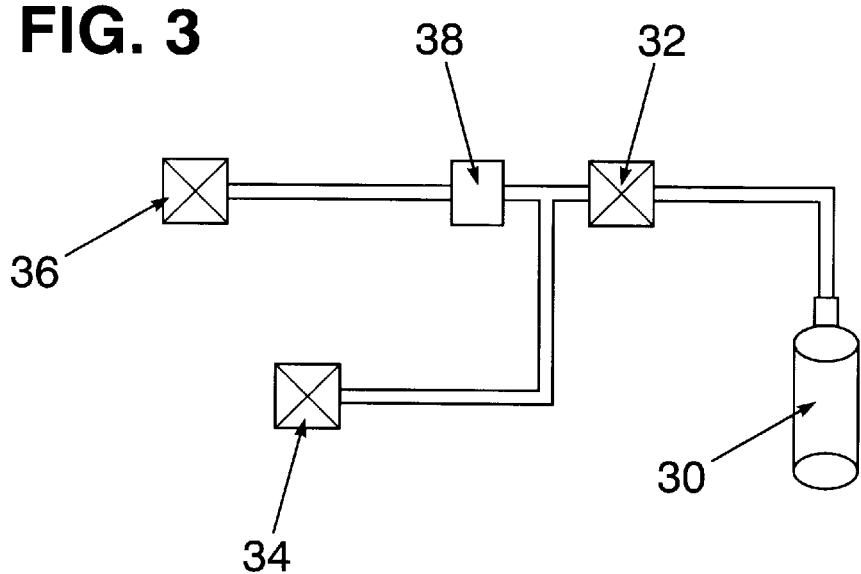
FIG. 3 is a simplified diagram of the deployment system associated with the arrangement shown in FIGS. 1 and 2.

FIG. 3 schematically illustrates a crash-preventing gas bag deployment system mounted within the helicopter 10. The deployment system according to one embodiment includes a cylinder 30 of pressurized bag inflating gas, such as carbon dioxide ($CO_2$). Outflow of the bag inflating gas from cylinder 30 is selectively controlled through a gas actuation valve 32, from which the pressurized gas is simultaneously fed to a pneumatic strut fastener release valve 34 and to a pneumatic bag inflation valve 36 through a time delay valve 38. Accordingly, upon detection of wheel assembly damage by some suitable sensor for example, gas bag deployment is selectively initiated by opening of the otherwise closed valve 32 to detach the landing gear assemblies 20 by pneumatic release of their associated fastener assemblies 28 through valve 36 and thereby initiate jettisoning under gravitational force. Such initiated jettisoning of the landing gear assemblies 20 is followed by pneumatically controlled inflation of the bags 16 through valve 36, causing displacement thereof from the container 18 into the wells 14 to complete deployment. Completion of bag deployment by initiating bag inflation is delayed through valve 38 for a suitable length of time, such as 30 seconds, to insure that the landing gear assemblies 20 being jettisoned clear the helicopter 10 before the inflated bags 16 are received in the wells 14 so as to avoid damage thereto by puncture.

Figure 4:
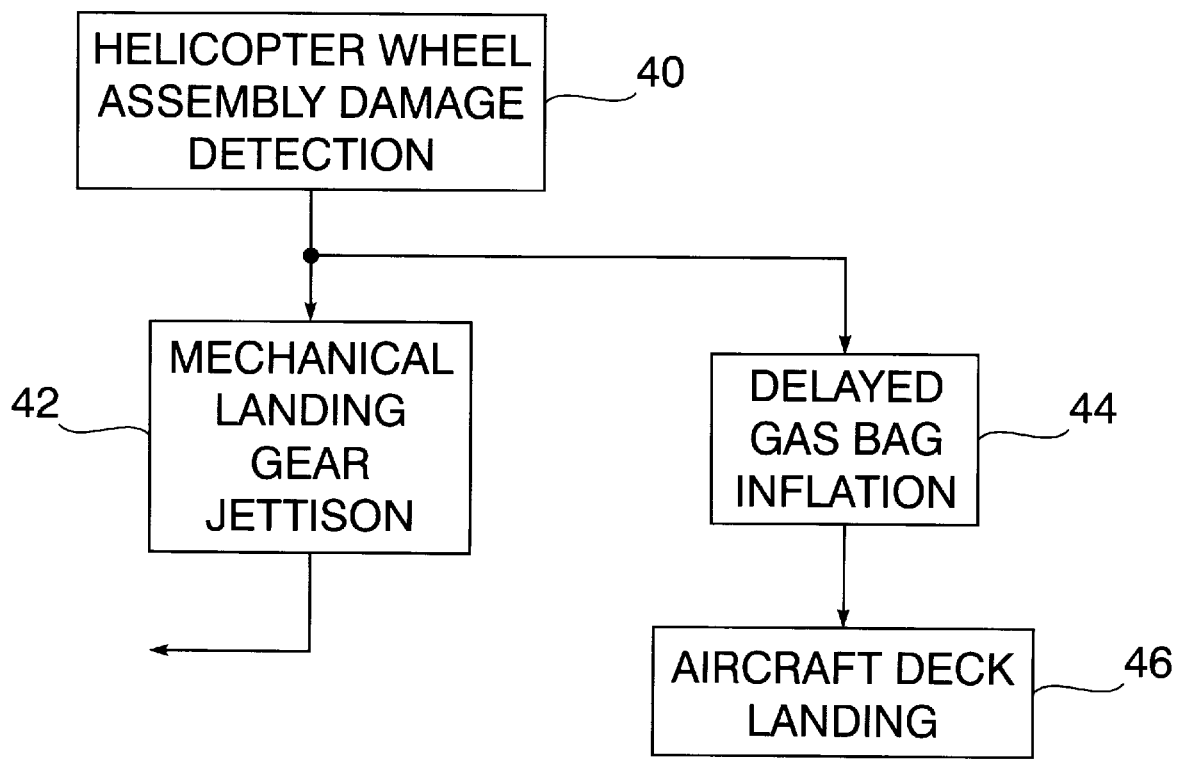
FIG. 4 is a block diagram schematically depicting the operational sequence associated with the deployment system.

The operational sequence of the bag deployment system hereinbefore described, is summarized in FIG. 4 symbolically depicting selective initiation of deployment after detection 40 of helicopter wheel damage. Jettison 42 of the mechanical landing gear assemblies 20 is then effected, followed by delayed inflation of the bags 16 for replacement of the landing gear assemblies undergoing jettison 44 to complete deployment prior to aircraft deck landing 46.

Obviously, other modifications and variation of the present invention may be possible in light of the foregoing teachings. It is therefore to be understood that within the scope of the appended claims the invention may be practiced otherwise than as specifically described.

What is claimed is:

1. In combination with aircraft having mechanical landing gear, inflatable bags and means for inflation of said bags to prevent crash landing, a system for controlled deployment of the bags comprising: means for selectively jettisoning the landing gear from the aircraft upon detection of damage thereto; means responsive to said jettisoning of the landing gears for sequentially effecting said inflation of the bags to replace the landing gear; and means for delaying said inflation of the bags to avoid puncture thereof by the landing gear being jettisoned.

2. The combination as defined in claim 1, wherein the aircraft is formed with wells from which the landing gear is jettisoned and into which the bags are displaced in response to said inflation thereof.

3. The combination as defined in claim 2, including releasable fastener means for attaching the landing gear to the aircraft and through which said jettisoning is initiated.

4. The controlled deployment system as defined in claim 3, wherein said selective jettisoning means includes: a cylinder of pressurized gas; and selectively controlled valve means connecting said cylinder to the releasable fastener means for detaching the landing gear from the aircraft.

5. The controlled deployment system as defined in claim 4, wherein said means for delaying said inflation of the bags includes: time-delay valve means for connecting the cylinder through the selectively controlled valve means to the bag inflation means.

6. The controlled deployment system as defined in claim 1, including releasable fastener means for attaching the landing gear to the aircraft and through which said jettisoning is initiated.

7. The controlled deployment system as defined in claim 6, wherein said selective jettisoning means includes: a cylinder of pressurized gas; and selectively controlled valve means connecting said cylinder to the releasable fastener means for detaching the landing gear from the aircraft.

8. The controlled deployment system as defined in claim 7, wherein said means for delaying said inflation of the bags includes: time-delay valve means for connecting the cylinder through the selectively controlled valve means to the bag inflation means.

9. In combination with aircraft having mechanical landing gear, inflatable bags and means for inflation of said bags to prevent crash landing, a system for controlled deployment of the bags comprising the steps of: selectively jettisoning the landing gear from the aircraft upon detection of damage thereto; effecting said inflation of the bags in sequence following said jettisoning of the landing gear for replacement thereof; and delaying said inflation of the bags to avoid puncture thereof by the landing gear being jettisoned.

10. In combination with an aircraft having a landing gear extending therefrom and means stored therein for absorbing impact with a landing surface ordinarily engaged by the landing gear, a method of deploying the impact absorbing means from storage for safe landing of the aircraft on said landing surface when the landing gear is damaged, comprising the steps of: jettisoning the landing gear from the aircraft; and inflating the impact absorbing means in time delayed sequence to initiation of said jettisoning of the landing gear for replacement of the landing gear on the aircraft during said safe landing thereof without damage to the impact absorbing means by the landing gear undergoing said jettisoning.

11. The method as defined in claim 10, wherein said jettisoning of the landing gear is initiated by selective detachment thereof from the aircraft.

\* \* \* \* \*